(12) United States Patent
Yumita (10) Patent No.: US 9,190,679 B2
(45) Date of Patent: Nov. 17, 2015

(54) FUEL CELL SYSTEM

(75) Inventor: Osamu Yumita, Nagoya (JP)

(73) Assignee: TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 323 days.

(21) Appl. No.: 13/386,178

(22) PCT Filed: Jul. 21, 2009

(86) PCT No.: PCT/JP2009/063064
§ 371 (c)(1),
(2), (4) Date: Jan. 20, 2012

(87) PCT Pub. No.: WO2011/010365
PCT Pub. Date: Jan. 27, 2011

(65) Prior Publication Data
US 2012/0183875 A1  Jul. 19, 2012

(51) Int. Cl.
*H01M 8/04* (2006.01)
*H01M 8/06* (2006.01)
(52) U.S. Cl.
CPC ...... *H01M 8/04223* (2013.01); *H01M 8/04119* (2013.01); *H01M 8/04253* (2013.01); *H01M 8/0662* (2013.01); *Y02E 60/50* (2013.01)
(58) Field of Classification Search
CPC .................................................. H01M 8/04253
USPC ........................................ 429/429, 436, 442
See application file for complete search history.

(56) References Cited

U.S. PATENT DOCUMENTS

| 7,718,289 | B2 | 5/2010 | Asai et al. | |
|---|---|---|---|---|
| 8,206,856 | B2 * | 6/2012 | Katano | 429/415 |
| 2005/0271918 | A1 | 12/2005 | Murakami et al. | |
| 2010/0261082 | A1 | 10/2010 | Kajiware et al. | |

FOREIGN PATENT DOCUMENTS

| JP | 2002-246053 | A | | 8/2002 |
|---|---|---|---|---|
| JP | 2003203665 | A | | 7/2003 |
| JP | 2004-193102 | A | | 7/2004 |
| JP | 2004193102 | | * | 7/2004 |
| JP | 2005302515 | A | | 10/2005 |
| JP | 2006-147452 | A | | 6/2006 |
| JP | 2006147452 | | * | 6/2006 |
| JP | 2006-286483 | A | | 10/2006 |

(Continued)

OTHER PUBLICATIONS

International Search Report mailed Oct. 20, 2009 of PCT/JP2009/063064.

*Primary Examiner* — Ula C Ruddock
*Assistant Examiner* — Thomas Parsons
(74) *Attorney, Agent, or Firm* — Kenyon & Kenyon LLP (57) ABSTRACT

A fuel cell system that is capable of suppressing temperature change of the fuel cell under a low temperature environment after the operation has stopped, suppressing freezing due to condensation, and ensuring a preferable start thereafter. The fuel cell system comprises: a fuel cell that generates electric power through an electrochemical reaction between air and a hydrogen gas; a gas supply section that supplies air and the hydrogen gas to an air supply path, a fuel supply path and a hydrogen circulation path which are connected to the fuel cell by a compressor and a hydrogen pump; a cooling section that cools the fuel cell by making a cooling path connected to the fuel cell to circulate by a pump the cooling water that is cooled by a radiator; and a control section.

8 Claims, 5 Drawing Sheets

(56) References Cited

FOREIGN PATENT DOCUMENTS

| | | |
|---|---|---|
| JP | 2007-042445 A | 2/2007 |
| JP | 2007-164998 A | 6/2007 |
| JP | 2007-328972 A | 12/2007 |
| JP | 2008-077959 A | 4/2008 |
| JP | 2008-166126 A | 7/2008 |
| JP | 2008-525980 A | 7/2008 |
| JP | 2008166018 * | 7/2008 |
| JP | 2008-198534 A | 8/2008 |
| JP | 2008-218289 A | 9/2008 |
| JP | 2009-032610 A | 2/2009 |
| WO | 2008/142972 A1 | 11/2008 |

* cited by examiner

FUEL CELL SYSTEM

This is a 371 national phase application of PCT/JP2009/063064 filed 21 Jul. 2009, the contents of which are incorporated herein by reference.

TECHNICAL FIELD

The invention relates to a fuel cell system comprising a fuel cell.

BACKGROUND ART

In recent years, fuel cell systems have been developed which have as an energy source a fuel cell that generates electric power through an electrochemical reaction of a reaction gas (fuel gas and oxidant gas). This type of fuel cell system may be configured to cool the fuel cell while the operation is stopped more rapidly than during normal operation and delay the deteriorative reaction of the fuel gas due to carbon oxidation caused by gas remaining in the fuel cell (see, for example, Patent Document 1), or may be configured to allow the fuel cell to circulate the cooling water until the temperature of the fuel cell, after the power generation is stopped, is below the cooling water circulation stop temperature which is the criterion of judgment for stopping the circulation of the cooling water (see, for example, Patent Document 2).

PRIOR ART REFERENCES

Patent Documents

Patent Document 1: Japanese laid-open patent publication No. 2007-328972
Patent Document 2: Japanese laid-open patent publication No. 2007-164998

SUMMARY OF THE INVENTION

Problem to be Solved by the Invention

If the operation stop time continues for long hours at below zero, the fuel cell is cooled from the periphery by the outside air. Then, the temperature difference between the center and the periphery of the fuel cell increases, and thus a condensation may occur in the gas passage of the fuel cell and the remaining water vapor may freeze, even if the inside of the gas passage is scavenged after the operation has stopped. Particularly, at the narrow gas passage section such as a common rail arranged at the periphery of the fuel cell, the gas flow may decrease due to freezing, thereby causing a degradation of the start-up performance.

The present invention has been made in light of such problems, and its object is to provide a fuel cell system that is capable of suppressing freezing due to concentration by suppressing the increase in temperature difference between the sections of the fuel cell at below zero after the operation has stopped, thereby ensuring a preferable start thereafter.

Means for Solving the Problem

In order to attain the object described above, a fuel cell system according to the present invention comprises: a fuel cell that generates electric power through an electrochemical reaction between a fuel gas and an oxidant gas; a gas supply section that supplies a fuel gas and an oxidant gas to a gas passage connected to the fuel cell; a cooling section that cools the fuel cell; and a control section that performs a scavenging process that sends the fuel gas and the oxidant gas to the gas passage by the gas supply section to perform scavenging, and a cooling process that cools the fuel cell by the cooling section, when it is determined that a temperature of the fuel cell would be below 0° C. after generation of electric power by the fuel cell has stopped.

According to the fuel cell system of this configuration, when the control section determines that the fuel cell would be below zero after the generation of electric power by the fuel cell has stopped, the control section sends the fuel gas and oxidant gas to the gas passage to perform scavenging and cooling of the fuel cell, thereby enabling the fuel gas to be rapidly cooled and the water vapor in the gas passage to be liquefied and discharged.

This enables suppressing the failure such as an occurrence of condensation and freezing of the water vapor remaining in the gas passage of the fuel cell caused by the fuel cell being cooled from the periphery by the outside air due to long hours of operation stop time, causing the temperature difference between the center and the periphery of the fuel cell to be large. Therefore, freezing may be suppressed also at the narrow gas passage section such as a common rail positioned at the periphery of the fuel cell, and the gas flow during the start thereafter is ensured, enabling a fine start.

In the fuel cell system of the present invention, the control section may stop the cooling process at the point when the fuel cell is at a preset cooling completion temperature.

In the fuel cell system of the present invention, the control section may stop the scavenging process at the point when a predetermined time has elapsed after the cooling process has stopped.

In the fuel cell system of the present invention, the control section may stop the scavenging process at the point when an impedance value of the fuel cell is equal to or greater than a predetermined value after the cooling process has stopped.

In the fuel cell system of the present invention, the cooling section may include a pump that makes a cooling path connected to the fuel cell to circulate a cooling medium, and a radiator including a cooling fan that heat-exchanges the cooling medium with outside air.

In the fuel cell system of the present invention, the control section may determine a cooling completion timing from a temperature of the fuel cell and a pre-stored temperature change map of the fuel cell, the cooling completion timing being the timing when the fuel cell is at the cooling completion temperature, and the control section may control the pump and the cooling fan such that a full stop timing matches the cooling completion timing, the full stop timing being the timing when the pump and the cooling fan fully stop at the cooling completion timing.

In the fuel cell system of the present invention, the cooling path may be connected with a cooling medium tank with the cooling medium stored therein, and the cooling medium in the cooling medium tank may be circulated into the cooling path by a drive of the pump during the cooling process.

Effect of the Invention

The fuel cell system of the present invention is capable of suppressing changes in temperature of the fuel cell under a low temperature environment after the operation has been stopped, suppressing freezing due to concentration and ensuring a preferable start thereafter.

DESCRIPTION OF REFERENCE NUMERALS

1 . . . Fuel cell system; 20 . . . Fuel cell; 50 . . . Control section; 71 . . . Air supply path (gas passage); 73 . . . Cooling path; 74 . . . Fuel supply path (gas passage); 75 . . . Hydrogen circulation path (gas passage); A3 . . . Compressor (gas supply section); C1 . . . Pump (cooling section); C2 . . . Radiator (cooling section); C13 . . . Cooling fan (cooling section); C16 . . . Cooling medium tank (cooling section); H50 . . . Hydrogen pump (gas supply section)

MODE FOR CARRYING OUT THE INVENTION

First, the entire configuration of a fuel cell system 1 will be described. While this fuel cell system 1 is an on-vehicle power generation system for a fuel cell vehicle, it may also be applied to systems other than fuel cell systems for vehicles, such as fuel cell systems for various mobile objects including ships, airplanes, trains, walking robots, etc., and may also be applied to, for example, fixed fuel cell systems in which fuel cells are used as power generation equipment for structures (houses, buildings, etc.).

Figure 1:
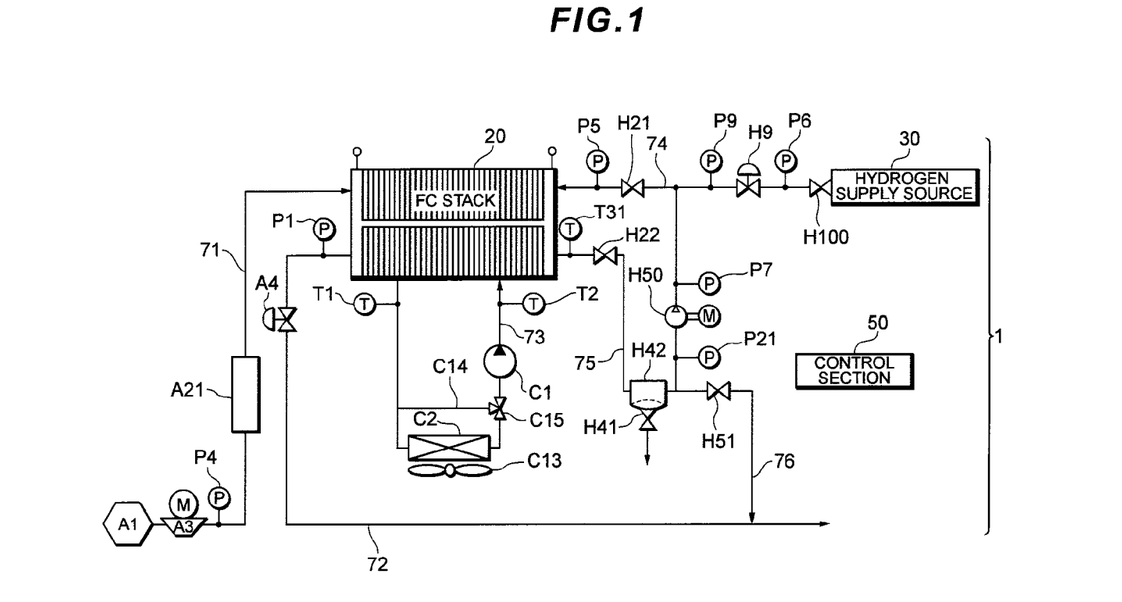
FIG. 1 is a schematic configuration diagram of a fuel cell system according to an embodiment of the present invention.

As shown in FIG. 1, air which serves as oxidant gas (reactant gas) is supplied to an air supply port of a fuel cell 20 via an air supply path 71. The air supply path 71 is provided with an air filter A1 that removes fine particles from the air, a compressor A3 that pressurizes the air, a pressure sensor P4 that detects the supply air pressure and a humidifier A21 that humidifies the air as required. The compressor A3 is driven by a motor M. The motor M is controlled and driven by a control section 50.

The air-off gas discharged from the fuel cell 20 is released to the outside through an exhaust path 72. The exhaust path 72 is provided with a pressure sensor P1 that detects the exhaust pressure and a pressure regulating valve A4. The pressure sensor P1 is provided near the air exhaust port of the fuel cell 20. The pressure regulating valve A4 functions as a pressure regulator that sets the pressure of air to be supplied to the fuel cell 20.

Detection signals of the pressure sensors P4 and P1 are transmitted to the control section 50. The control section 50 regulates the rotational speed of the motor of the compressor A3 and the degree/area of opening of the pressure regulating valve A4, thereby setting the pressure and flow rate of air to be supplied to the fuel cell 20.

Hydrogen gas which serves as fuel gas (reactant gas) is supplied from a hydrogen supply source 30 to a hydrogen supply port of the fuel cell 20 via a hydrogen supply path 74. The hydrogen supply path 74 is provided with: a cutoff valve H100 that supplies hydrogen from the hydrogen supply source 30 or stops such supply; a pressure sensor P6 that detects the supply pressure of the hydrogen gas from the hydrogen supply source 30; a hydrogen pressure regulating valve H9 that reduces and regulates the pressure of hydrogen gas to be supplied to the fuel cell 20; a pressure sensor P9 that detects the hydrogen gas pressure at the downstream of the hydrogen pressure regulating valve H9; a cutoff valve H21 that opens and closes the passage between the hydrogen supply port of the fuel cell 20 and the hydrogen supply path 74; and a pressure sensor P5 that detects the pressure of the hydrogen gas at the inlet of the fuel cell 20. Detection signals of the pressure sensors P5, P6 and P9 are also supplied to the control section 50.

The hydrogen gas not consumed in the fuel cell 20 is discharged, as hydrogen-off gas, to a hydrogen circulation path 75, and then returned to the hydrogen supply path 74, downstream of the hydrogen pressure regulating valve H9. The hydrogen circulation path 75 is provided with: a temperature sensor T31 that detects temperature of the hydrogen-off gas; a cutoff valve H22 that communicates/cuts off the fuel cell 20 and the hydrogen circulation path 75; a gas-liquid separator H42 that recovers water from the hydrogen-off gas; a drain valve H41 that collects the recovered product water outside of the hydrogen circulation path 75, for example, in a tank not shown in the drawing; and a hydrogen pump H50 that pressurizes the hydrogen-off gas.

The cutoff valves H21 and H22 close the anode side of the fuel cell 20. The detection signal of the temperature sensor T3 that is not shown is supplied to the control section 50. The operation of the hydrogen pump H50 is controlled by the control section 50.

The hydrogen-off gas joins the hydrogen gas in the fuel supply path 74, and is supplied to the fuel cell 20 and reused there. The cutoff valves H100, H21 and H22 are driven by signals from the control section 50.

The hydrogen circulation path 75 is connected to the exhaust path 72 via a discharge control valve H51 through a purge flow path 76. The discharge control valve H51 is an electromagnetic cutoff valve, and when it operates in response to a command from the control section 50, the hydrogen-off gas is discharged (purged) to the outside. By carrying out the above purging operation intermittently, the circulation of the hydrogen-off gas is repeated and cell voltage reduction due to an increase in the impurity concentration in the hydrogen gas at the fuel electrode side can be prevented.

A cooling water inlet/outlet of the fuel cell 20 is provided with a cooling path 73 for circulating a cooling water (cooling medium). The cooling path 73 is provided with: a temperature sensor T1 that detects temperature (outlet temperature) of the cooling water drained from the fuel cell; a radiator (heat exchanger) C2 that dissipates the heat of the cooling water to the outside; a pump C1 that pressurizes the cooling water and circulates it; and a temperature sensor T2 that detects temperature (inlet temperature) of the cooling water supplied to the fuel cell 20. The radiator C2 is provided with a cooling fan C13 that is driven by a motor to rotate.

The cooling path 73 is provided with a bypass path C14 in parallel with the radiator C2. A three-way valve C15 controlled by the control section 50 is provided at a connection point between one end of the bypass path C14 and the cooling path 73, and with the switching of this three-way valve C15, the passage of the cooling path 73 is in communication with either the radiator C2 or the bypass path C14.

The fuel cell 20 is configured as a fuel cell stack formed of a desired number of stacked unit cells, which are supplied with fuel gas and oxidant gas and generate electric power. The electric power generated by the fuel cell 20 is supplied to a power control section not shown in the drawing. The power control unit is provided with, for example, an inverter that drives a motor for the vehicle, an inverter that drives various auxiliary apparatuses such as a compressor motor and a hydrogen pump motor, and a DC-DC converter that charges power storage means such as a secondary battery and supplies power from the above power storage means to motors.

The control section 50 receives, although not shown in the drawing, a required load such as an acceleration signal of the vehicle and control information from the sensors (pressure sensor, temperature sensor, flow rate sensor, output current meter, output voltage meter, etc.) in the respective parts of the fuel cell system 1, thereby controlling the operation of the valves and motors in the respective parts of the system.

Next, a control by the control section 50 when the operation (power generation) of the fuel cell system 1 is stopped will be described below.

Figure 2:
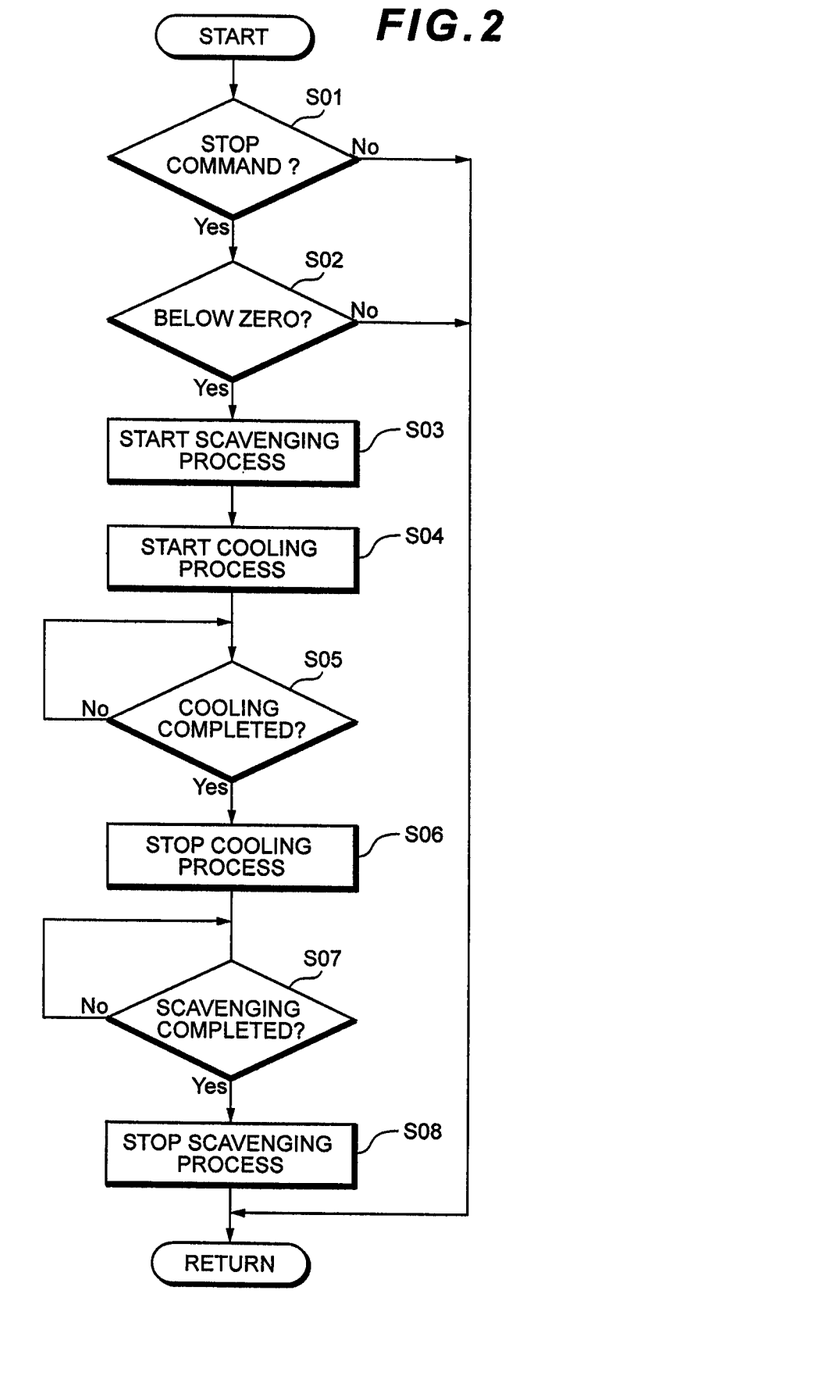
FIG. 2 is a flow chart explaining a control by a control section when the fuel cell system is stopped.

FIG. 2 is a flow chart showing a control by the control section 50 when the fuel cell system 1 is stopped.

When the ignition switch is turned OFF and a command for stopping the system is output (Step S01), a below zero determination process is performed (Step S02). In this below zero determination process, it is determined as to whether or not it is possible for the fuel cell 20 to be below zero, based on the outside temperature, the depression of the below zero switch by the user, the positional information by GPS, seasonal information, day and time information, etc. For example, this is when the outside temperature is 10° C. or lower.

As a result, if it is not determined that it is possible for the fuel cell 20 to be below zero ("NO" in Step S02), the control section 50 normally stops the fuel cell system 1. That is, if the fuel cell 20 does not go below zero, the condensation water would not freeze even if condensation of water vapor in the gas passage of the fuel cell 20 occurs. Accordingly, in this case, the operation stops normally without performing the below zero stop control after Step S03.

With respect to this, if it is determined that it is possible for the fuel cell 20 to be below zero ("YES" in Step S02), the control section 50 performs the below zero stop control after Step S03. FIG. 3 is a graph showing the temperature change, the timing of the control and the amount of water remaining in the gas passage in the below zero stop control.

When it is determined that it is possible for the fuel cell 20 to be below zero and the below zero stop control is to be performed (t1 in FIG. 3), a scavenging process starts (Step S03), and then a cooling process starts (Step S04). In the scavenging process, the pressure regulating valve A4 is fully opened and the compressor A3 is driven at the maximum rotational speed (see FIG. 3(E)), and the hydrogen pump H50 is driven at a maximum rotational speed in a state where the drain valve 41 of the gas-liquid separator H42 is always opened or has an increased open/close frequency (see FIG. 3(E)).

Due to this, scavenging of the gas passage of air and hydrogen gas connected to the fuel cell 20 is performed. By opening the drain valve H41, water from the gas-liquid separator 42 and the hydrogen inside the hydrogen circulation path 75 are discharged and the pressure is decreased, thereby causing a reduction in the scavenging effect. Therefore, the control section 50 controls the hydrogen pressure regulating valve H9 and supplies the hydrogen gas from the hydrogen supply source 30 into the hydrogen circulation path 75 such that the inside of the hydrogen circulation path 75 is at a predetermined pressure or higher, based on the pressure values of pressure sensors P5, P9 and P21.

Figures 3A, 3B, 3C, 3D, 3E:
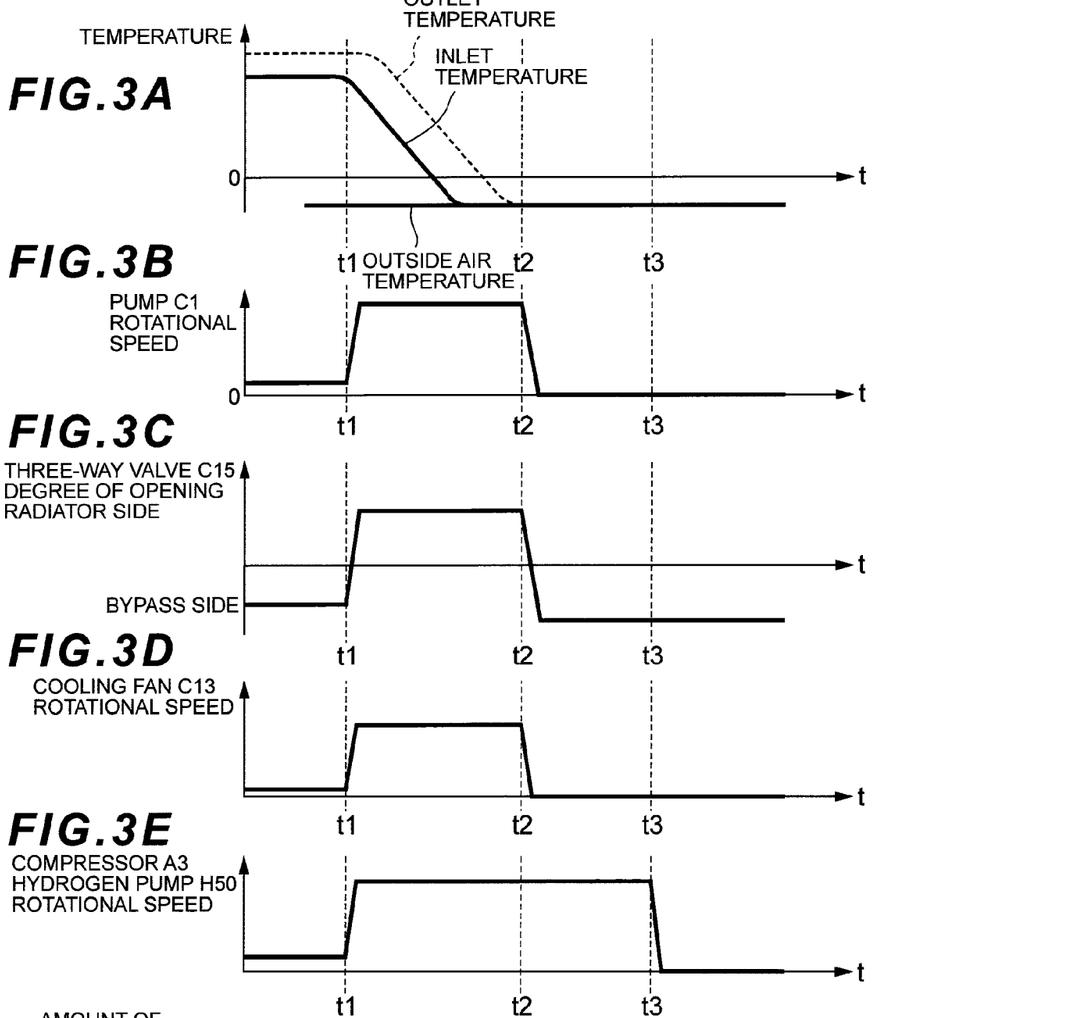
FIG. 3 is a graph showing a temperature change, a timing of control, and amount of water remaining in a gas passage in a below zero stop control.

In the cooling process, the three-way valve C15 is controlled to fully close the bypass path C14 side and fully open the radiator C2 side to communicate the cooling path 73 with the radiator C2 (see FIG. 3(C)) and drive the pump C1 and the cooling fan C13 at a maximum rotational speed (see FIGS. 3 (B) and (D)), thereby causing the fuel cell 20 to circulate the cooling water and cool the fuel cell 20.

Figure 3F:
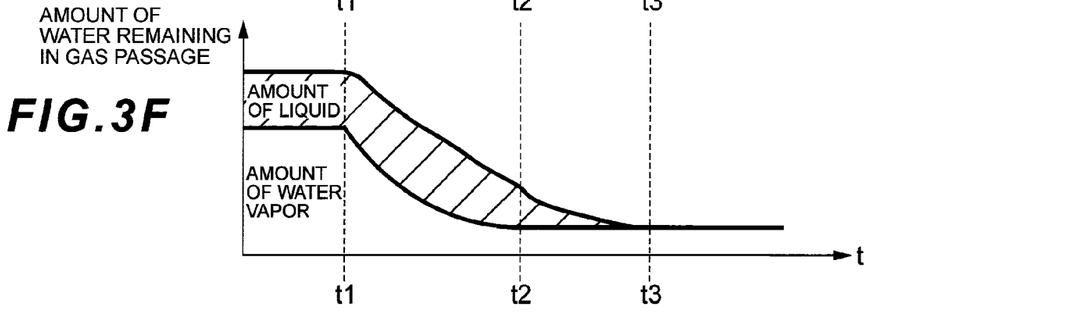

Along with the above scavenging process, the liquid phase and vapor phase water in the gas passage of the fuel cell 20 is discharged and the total amount of remaining water is decreased (see FIG. 3 (F)). At this point, the temperature of the fuel cell 20 is gradually decreased by the cooling process, and the inlet temperature and the outlet temperature of the cooling water in the fuel cell 20 is also decreased (see FIG. 3 (A)), thereby causing the water existing as the water vapor to gradually become liquid and the ratio of the water vapor in the entire amount of remaining water to be decreased in the fuel cell 20 (see FIG. 3(F)).

Next, the control section 50 performs a completion determination of a cooling process (Step S05). In the completion determination of the cooling process, the control section 50 estimates the internal temperature of the fuel cell 20 based on the detection results of temperature sensors T1 and T2 and determines whether or not the fuel cell 20 is at the cooling completion temperature. The cooling completion temperature refers to the temperature at which the fuel cell 20 does not freeze from being cooled too much, and this temperature is set to a predetermined temperature that is slightly higher than the outside temperature, for example, about 5 to 10° C. higher than the outside temperature.

As a result of completion determination of the cooling process, when it is determined that the cooling process has been completed (t2 in FIG. 3), the three-way valve C15 is controlled to fully close the radiator C2 side and fully open the bypass path C14 side so as to communicate the cooling path 73 to the bypass path C14 (see FIG. 3 (C)), stop the drives of the pump C1 and the cooling fan C13 (see FIGS. 3 (B) and (D)) and stop the cooling process of the fuel cell 20 by the cooling water (Step S06).

Next, the control section 50 performs a completion determination of a scavenging process after the cooling process has stopped (Step S07). The completion determination of the scavenging process is determined by whether or not the fuel cell 20 is at the stop timing of the scavenging process after the cooling process has stopped. This stop timing is at the point when the amount of remaining water which is the liquid inside the gas passage of the fuel cell 20 is almost empty, and for example, this timing is set to the point when a predetermined time (for example, about ten seconds) has passed after the cooling process has stopped or the point when the impedance value of the fuel cell 20 which is increased by the amount of water remaining in the fuel cell 20 is at the predetermined value or higher.

As a result of a completion determination of the scavenging process, when it is determined that the scavenging process has been completed (t3 in FIG. 3), the pressure regulating valve A4 is closed to stop the drive of the compressor A3 (see FIG. 3(E), and further, the drain valve H41 of the gas-liquid separator H42 is closed to stop the drive of the hydrogen pump H50 (see FIG. 3 (E)) and then to stop the scavenging of the gas passage of the fuel cell 20 (Step S08). This enables the water which is the liquid in the gas passage of the fuel cell 20 to be almost completely drained (see FIG. 3 (F)).

As described above, according to the fuel cell system 1 of the above embodiment, since the control section 50 scavenges the gas passage of the air and hydrogen gas connected to the fuel cell 20 and cools the fuel cell 20 when it is determined that the fuel cell 20 would be below zero after the power generation of the fuel cell 20 has been stopped, it is capable of rapidly cooling the fuel cell 20 to liquefy and drain the water vapor in the gas passage.

That is, by forcibly cooling the fuel cell 20 and approximating to the outside temperature, at below zero, it is capable of suppressing the failure such as an occurrence of condensation and freezing of the water vapor remaining in the gas passage of the fuel cell 20 caused by the fuel cell 20 being cooled from the periphery by the outside air due to long hours of operation stop time, causing the temperature difference between the center and the periphery of the fuel cell to be large.

Therefore, freezing may be suppressed also at the narrow gas passage section such as a common rail positioned at the periphery of the fuel cell 20, and the gas flow during the start thereafter is ensured, enabling a fine start.

Since the control section 50 stops the cooling process at the point when the fuel cell 20 is at the cooling completion temperature, it is possible to eliminate the failure such as freezing the fuel cell 20 due to too much cooling, if the cooling completion temperature is set, for example, to a predetermined temperature that is slightly higher than the outside temperature, for example, 5 to 10° C. higher than the outside temperature.

After the cooling process has stopped, the control section 50 stops the scavenging process at the point when a predetermined time has passed or the point when the impedance value of the fuel cell is at the predetermined value or higher. Thus, this enables the water remaining in the fuel cell 20 to be successfully drained after the cooling process.

In the above embodiment, when the control section 50 determined that the temperature is at the cooling completion temperature (t2 in FIG. 3), the three-way valve C15 was controlled (see FIG. 3 (C)) to stop the drives of the pump C1 and the cooling fan C13 (see FIGS. 3 (B) and (D)) and stop the cooling process of the fuel cell 20 by the cooling water. However, the fuel cell 20 would be cooled until the three-way valve C15 is driven after the cooling process completion determination to switch the passage and until the pump C1 and the cooling fan C13 are completely stopped after the cooling process completion determination.

Figures 4A, 4B:
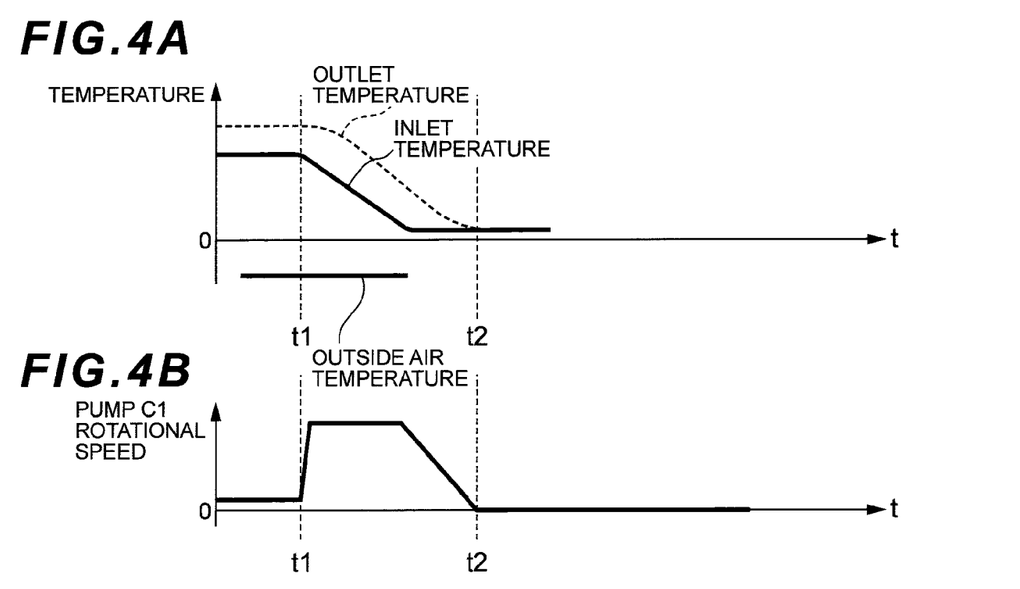
FIG. 4 is a graph showing another example of a below zero stop control.
Figure 4C:
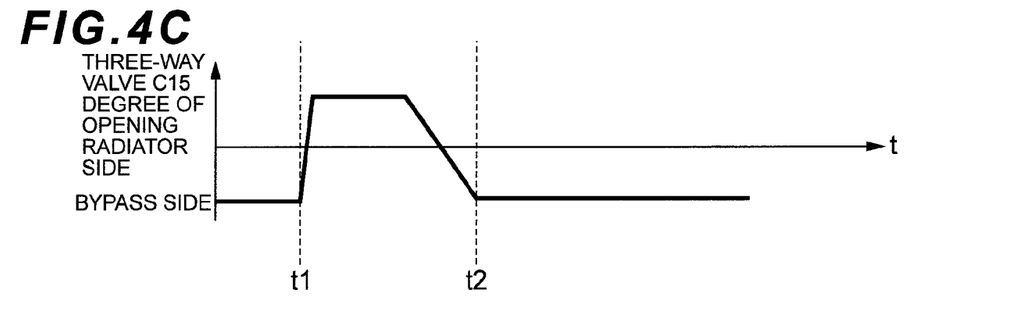

FIG. 4 shows a cooling process stop control for suppressing excess cooling of the fuel cell 20 caused by the response delay of the above-mentioned three-way valve C15, pump C1 and the cooling fan C13. In this control, the cooling completion timing (t2 in FIG. 4) which is the timing when the temperature is at the target temperature, i.e. the cooling completion temperature (preferably, 0 to 5° C.), is determined from the internal temperature of the fuel cell 29 estimated from temperature sensors T1 and T2 of the cooling water in the fuel cell 20 and the pre-stored temperature change map of the fuel cell 20.

The three-way valve C15, the pump C1 and the cooling fan C13 are controlled such that the full stop timing which is when the three-way valve C15, the pump C1 and the cooling fan C13 are completely stopped matches the determined cooling completion timing (see FIGS. 4 (B) and (C)). In this control, by switching the three-way valve C15 gradually towards the cooling completion timing and gradually stopping the pump C1 and the cooling fan C13, the full stop timing which is when the three-way valve C15, the pump C1 and the cooling fan C13 are completely stopped is matched with the determined cooling completion timing with a high accuracy, and the fuel cell 20 is set to be at the cooling completion temperature which is the target temperature with a higher accuracy.

Therefore, according to this control, the excess cooling of the fuel cell 20 described above caused by the response delay of the three-way valve C15, pump C1 and cooling fan C13 can be suppressed, thereby suppressing the freezing.

Figure 5:
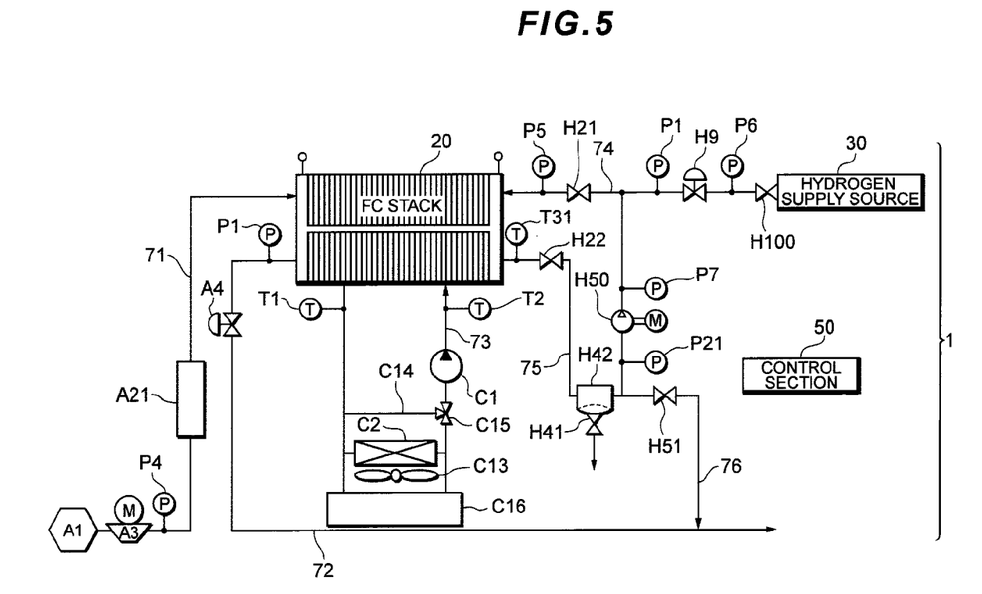
FIG. 5 is a schematic configuration diagram showing a modification of the fuel cell system.

FIG. 5 shows a fuel cell system 1 provided with a cooling water tank (cooling medium tank) C16, in which cooling water is stored therein, in parallel with the radiator C2, and the cooling water tank C16 has a heat capacity that is larger than the radiator C2.

In this fuel cell system 1, not only the cooling water stocked in the radiator C2 but also a large amount of cooling water stocked in the cooling water tank C16 can be circulated to the fuel cell 20 by the pump C1 during the cooling process, thereby shortening the cooling process time of the fuel cell 20 and largely shortening the control time of the below zero stop control.

During the scavenging process and the cooling process, in light of the process time reduction, it is preferable to drive the compressor A3, hydrogen pump H50, pump C1 and cooling fan C13 to a maximum rotational speed. However, the drives of the compressor A3, hydrogen pump H50, pump C1 and cooling fan C13 during the scavenging process and cooling process do not necessarily have to be at a maximum rotational speed, on the condition that the scavenging process and cooling process are appropriately performed.

What is claimed is:

1. A fuel cell system comprising:
a fuel cell that generates electric power through an electrochemical reaction between a fuel gas and an oxidant gas;
a gas supply section that supplies a fuel gas and an oxidant gas to a gas passage connected to the fuel cell;
a cooling section that cools the fuel cell; and
a control section which is programmed to:
perform a scavenging process that sends the fuel gas and the oxidant gas to the gas passage to perform scavenging,
perform a cooling process that cools the fuel cell by the cooling section to an internal temperature of the fuel cell at which water vapor remaining in the gas passage does not freeze due to being cooled, when it is determined that an outside temperature of the fuel cell would be below 0° C. after generation of electric power by the fuel cell has stopped, and
stop gradually the cooling process by the cooling section to prevent excessive cooling of the fuel cell.

2. The fuel cell system according to claim 1, wherein the control section is programmed to stop the cooling process at the point when the fuel cell is at a preset cooling completion temperature.

3. The fuel cell system according to claim 2, wherein the control section is programmed to stop the scavenging process at the point when a predetermined time has elapsed after the cooling process has stopped.

4. The fuel cell system according to claim 2, wherein the control section is programmed to stop the scavenging process at the point when an impedance value of the fuel cell is equal to or greater than a predetermined value after the cooling process has stopped.

5. The fuel cell system according to claim 2, wherein the cooling section includes a pump that makes a cooling path connected to the fuel cell to circulate a cooling medium, and a radiator including a cooling fan that heat-exchanges the cooling medium with outside air.

6. The fuel cell system according to claim 5, wherein the control section is programmed to determine a cooling completion timing from the internal temperature of the fuel cell and a pre-stored temperature change map of the fuel cell, the cooling completion timing being the timing when the fuel cell is at the cooling completion temperature, and the control section controls the pump and the cooling fan such that a full stop timing matches the cooling completion timing, the full stop timing being the timing when the pump and the cooling fan fully stop at the cooling completion timing.

7. The fuel cell system according to claim 6, wherein the cooling path is connected with a cooling medium tank with the cooling medium stored therein, and the cooling medium in the cooling medium tank is circulated into the cooling path by a drive of the pump during the cooling process.

8. The fuel cell system according to claim 5, wherein the cooling path is connected with a cooling medium tank with the cooling medium stored therein, and the cooling medium in the cooling medium tank is circulated into the cooling path by a drive of the pump during the cooling process.

* * * * *